No. 727,420. PATENTED MAY 5, 1903.
A. S. NUNAMAKER.
MEASURING WHEEL OR TRAVELER.
APPLICATION FILED OCT. 3, 1902.
NO MODEL
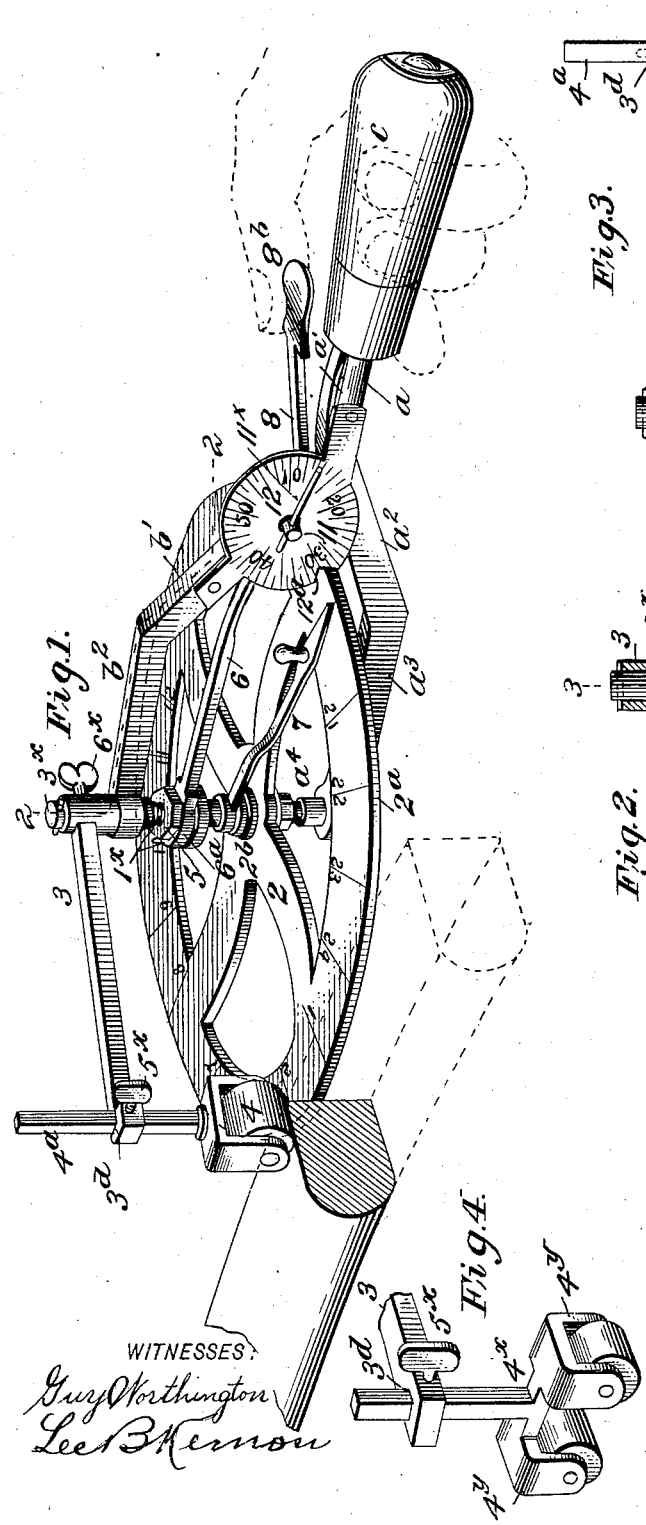
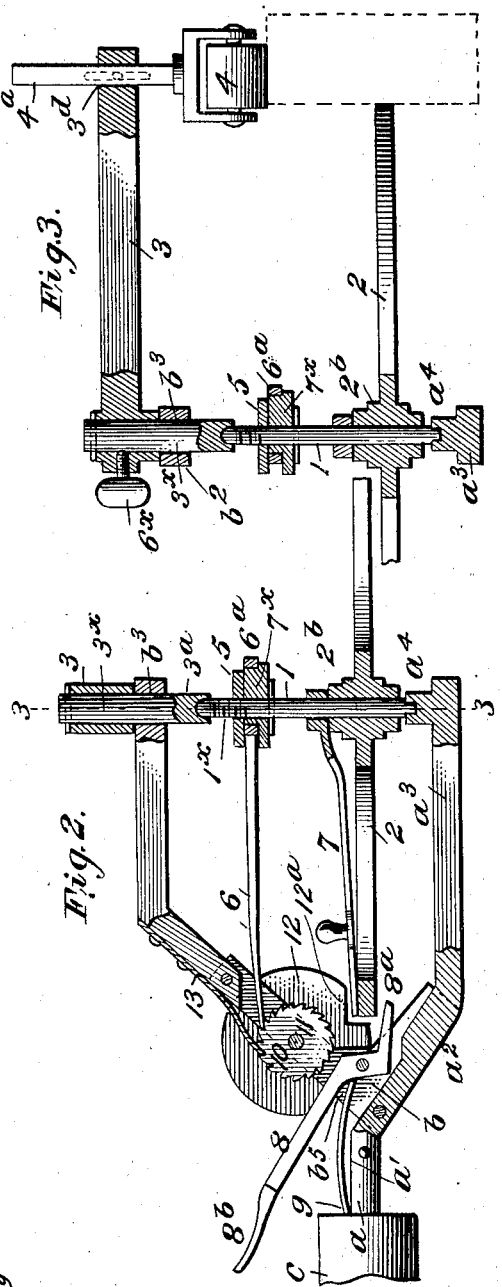
WITNESSES:
Guy Worthington
Lee B Kernon
INVENTOR
Arthur S. Nunamaker
BY
Fred G. Dieterich
ATTORNEYS
THE NORRIS PETERS CO., PHOTO-LITHO., WASHINGTON, D. C.

No. 727,420.                                              Patented May 5, 1903.

UNITED STATES PATENT OFFICE.

ARTHUR SEBASTIAN NUNAMAKER, OF LEXINGTON COUNTY, SOUTH CAROLINA, ASSIGNOR OF ONE-HALF TO GEORGE W. LYBRAND, OF BROOKLAND, SOUTH CAROLINA.

MEASURING-WHEEL OR TRAVELER.

SPECIFICATION forming part of Letters Patent No. 727,420, dated May 5, 1903.

Application filed October 3, 1902. Serial No. 125,815. (No model.)

*To all whom it may concern:*

Be it known that I, ARTHUR SEBASTIAN NUNAMAKER, residing in the county of Lexington and State of South Carolina, have invented a new and Improved Measuring-Wheel or Traveler, of which the following is a specification.

This invention relates to improvements in that type of traveler-wheel generally used by blacksmiths and wheelwrights for measuring tires and fellies and in which is included a graduated wheel adapted to travel on the surface of the object to be measured; and the said invention primarily seeks to provide an implement of the character stated of a simple and economical construction which can be conveniently manipulated to secure the exact measurements desired and which effectively serves its intended purposes.

In its general nature my invention comprehends the peculiar and novel coöperative arrangement of a combined supporting and handle member provided with a bifurcated end, a traveling wheel rotatably mounted on the said bifurcated end, and a brake device mounted upon the supporting member, with a finger-manipulated portion projected in the longitudinal plane of and in close proximity to the handle and having a braking portion adapted to engage the face of the traveling wheel.

In its more complete nature my invention also includes a novel arrangement of the bifurcated supporting member, a circumferentially-swingable lever mounted upon the bifurcated supporting member and having a hub portion adapted to act as a journal-box for one end of the traveling-wheel mandrel, and a guide vertically adjustable in the outer end of said lever for controlling the line of travel of the said wheel; and more subordinately my invention consists in certain details of construction and peculiar combination of parts, all of which will hereinafter be described, and specifically pointed out in the appended claims, reference being had to the accompanying drawings, in which—

Figure 1 is a perspective view illustrating my invention as in use. Fig. 2 is a vertical longitudinal section thereof, taken substantially on the line 2 2 of Fig. 1. Fig. 3 is a transverse section of the same on the line 3 3 of Fig. 2. Fig. 4 is a detail view illustrating a modified form of the guide portion hereinafter referred to.

In the practical construction my improved measuring appliance consists, essentially, of a combined supporting member and handle, a traveler or measuring-wheel, an adjustable guide, and a brake device therefor. The combined supporting member and handle consists of a shank $a$, upon the tapered end of which the handle $c$ is made fast in any approved manner. The shank portion extends from this handle in a plane therewith, as at $a'$, and the outer end of the part $a'$ merges with a downwardly-inclined portion $a^2$, which ends in an outwardly-extending horizontal arm $a^3$, the outer end of which has a stepped bearing $a^4$ for the lower end of the mandrel or shaft 1, upon which the traveler or measuring-wheel is mounted, as will be presently more fully explained.

$b$ designates a portion of the supporting-frame, which is fixedly attached or integrally formed with the part $a^2$ of the bottom portion of the supporting-frame, and the said arm $b$ is inclined upwardly, as at $b'$, and ends in an outwardly-extended horizontal arm $b^2$, the outer end of which is apertured vertically, as at $b^3$, the purpose of which will presently appear.

The arms $a^3$ $b^2$ are projected in the same vertical plane and form the forked end between which the traveler-wheel is supported and horizontally rotates. The traveler-wheel 2 is of suitable size and is supported to rotate horizontally in a plane with the shank member of the lower portion of the main or supporting frame and with its peripheral edge held to travel close up in the crotch of the forked or bifurcated end therefor.

The upper and lower faces of the perimeter of the wheel 2 are graduated in inches or fractions thereof, which form proper divisional portions of the entire circumference of the edge or rim $2^a$, which preferably is smooth, as shown.

The wheel 2 is provided with a tubular hub $2^b$, which is held to turn with the mandrel or shaft 1, the lower end of which is journaled in the bearing $a^4$ and the upper end supported in the manner best shown in Figs. 2 and 3, by reference to which it will be seen that the said upper end is held to turn on the pendent end of a spindle $3^x$, fixedly held in the aperture $b^3$ in the arm $b^2$.

The spindle $3^x$ forms a journal for the arm 3, that projects radially from the axis of the wheel 2 and extends to a point slightly beyond the circumference of the said wheel 2. The shaft 1 has an external thread $1^x$ at its upper end to receive the clamp-nut 5 for holding the annular rim or strap $6^a$ of an actuating-pawl 6 in proper engagement with eccentric disk or cam $7^x$, fixedly mounted on the shaft 1, as best shown in Figs. 1 and 2 and for the purpose presently described.

The arm 3 is a part of a circumferentially-adjustable guide, which includes the supporting-standard $4^a$, the lower end of which is bifurcated to receive a roller-bearing 4. The standard $4^a$ is vertically adjustable in the slot $3^d$ in the outer end of the arm 3, and it is held to its adjusted position by the clamp-screw $5^x$, and the said arm is also held to any of its circumferential adjustments by the clamp-screw $6^x$, that passes through the outer end of the arm $b^2$ and engages the socket $3^a$.

7 designates a pointer mounted on the sleeve portion $2^b$, being moved over the upper face of the wheel 2. The inclined portion $b'$ of the upper supporting member has a slot $b^5$, and in the said slot is pivotally supported a brake member 8, which extends in the longitudinal plane of the supporting member and the handle. The pivoted portion of the brake member 8 is disposed diagonally to the shank $a$, and its lower end extends to a point below the wheel and adjacent its rim, and the said end terminates in a flat bearing portion $8^a$, adapted to engage the under face of the wheel-rim, as will be readily understood from Fig. 2 of the drawings, and the upper end of the portion 8 terminates in a rearwardly-extending finger-piece $8^b$ in the plane of and extended over the handle $c$, whereby the operator can conveniently depress the said finger-piece and apply the brake to the wheel without shifting the hold upon the handle.

9 designates a spring for engaging the brake to hold it to its normal or inoperative position.

12 designates a register-dial fixedly secured upon one side of the supporting member $b$, and $11^x$ a pointer which traverses the dial and is mounted on the short shaft 11, journaled in the portion $b'$ of the frame $b$, as best shown in Fig. 2, by reference to which it will be observed the shaft 11 carries a ratchet-wheel 10, which engages a check-spring 13 and the actuating member 6, the said parts providing a simple means for registering the revolutions of the wheel 2 during the operation of measuring, it being obvious that the rotation of the mandrel, through its cam or eccentric, imparts intermittent thrust movement to the member 6, which by turning the ratchet-disk 10 moves the pointer $11^x$ on the dial 12.

The dial 12 is cut out, as at $12^a$, to permit of a proper movement of the finger 7.

From the foregoing, taken in connection with the accompanying drawings, the manner in which my invention is used and its advantages will be readily apparent to those skilled in the art to which it pertains.

The roller-bearing of the guide-lever, which can be raised or lowered, as desired, runs on the edge of the object to be measured, and thereby holds the wheel firm in engagement with the surface to be measured and so that there can be no deviation in the width or true line and a possible loss or inaccuracy in measurement caused by zigzagging or deviating from a true horizontal line, as is often the case in measuring-wheels of this class.

An important advantage derived in my construction of measuring-wheel or traveler is that the operator can run the wheel quickly over the surface to be measured without danger of losing the proper line of contact between the wheel and the surfaces it engages, and when the wheel reaches the end of the surface to be measured the operator can instantly apply the brake without changing the position of the appliance or his hold upon the handle, and thereby hold the wheel from making excessive rotation.

For some kinds of work it is desirable to use a double guide-bearing, consisting of two rollers arranged as illustrated in Fig. 4, in which the adjustable standard $4^a$ has a bridge portion $4^x$, provided with a pair of pendent bifurcated hangers $4^y$, in each of which is mounted a roller-guide or bearing member.

I am aware that measuring appliances for the purpose for which my invention is provided have heretofore been employed in which a measuring-wheel is mounted upon a handle member and a guide device combined therewith for gaging the depth and line of travel of the measuring-wheel.

My invention differentiates from what has heretofore been provided, so far as I know, in the peculiar construction of the combined supporting frame and handle, the brake means mounted thereon, the peculiar manner in which the gage or guide member is joined with the frame, and the detail combination of said parts with the measuring-wheel and the registering-dial.

Having thus described my invention, what I claim, and desire to secure by Letters Patent, is—

1. The hereinbefore-described measuring appliance, comprising in combination; a supporting-frame, one end of which terminates in a handle-receiving shank, and the other end of which includes a pair of opposing bearing-arms, the upper one of which has an upwardly and outwardly inclined portion provided with a slot, a brake member pivotally mounted in the said slot and extended in the longitudinal plane of the handle end of the frame, said brake member being diagonally disposed relatively to the said handle end, and having its upper end terminating in a finger member and its lower end bent to form a brake-shoe, said brake held to be normally out of engagement with the measuring-wheel, a shaft journaled in the outer ends of the opposing arms, a measuring-wheel rotatably supported on said shaft, said wheel having its outer edge movable over the brake-shoe, a circumferentially-adjustable arm axially fulcrumed on the upper bearing-arm, and extended to a point beyond the edge of the measuring-wheel, a standard adjustable in the outer end of said arm, and a roller-guide bearing mounted in the lower end of the said standard, all being arranged substantially as shown and for the purposes described.

2. A measuring appliance of the character described, comprising in combination with the measuring-wheel and the supporting-frame therefor, said supporting-frame including a pair of bearing-arms and a handle portion arranged in the same vertical plane, a registering device mounted upon the handle-frame, a dial-finger, actuating means for moving said finger at each complete revolution of the wheel, said means including an eccentric disk fixedly mounted upon the wheel-mandrel, the pusher-pawl 6 having a ring or strap portion to encircle the said eccentric disk, a ratchet-wheel and shaft connected to the dial-pointer with which the pressure-pawl 6 engages, and a brake mechanism normally held out of engagement with the measuring-wheel, said brake mechanism being mounted upon the supporting-handle frame in close proximity to the ratchet-wheel and dial, substantially as shown and for the purposes described.

3. The hereinbefore-described measuring appliance comprising in combination; a supporting-frame, said supporting-frame including a handle-receiving shank and a pair of opposing arms arranged in the same vertical plane the upper one of said arms including an inclined portion having a part thereof cut away, a member having a dial-face fitted over said cut-away portion of the upper arm, a ratchet-wheel mounted within said cut-away portion, a dial-pointer connected with said ratchet-wheel and adapted to travel on the outside of said dial-face, a shaft journaled in the outer ends of said arms, a measuring-wheel secured to the said shaft in a plane at right angles to the plane of the arms and a circumferentially-adjustable arm axially fulcrumed on the upper bearing-arm and extended to a point beyond the edge of the measuring-wheel, a standard adjustable in the outer end of said arm, and a roller-guide mounted in the lower end of the said standard, means for actuating the dial-finger, said means including a cam member mounted upon the measuring-wheel shaft and a pusher-pawl operated by said cam member, said pusher-pawl extending within the cut-away portion of the upper bearing-arm and engaging the ratchet-disk, substantially as shown and for the purposes described.

4. The hereinbefore-described measuring appliance, comprising in combination a supporting-frame, said supporting-frame including a handle-receiving shank and a pair of opposing arms arranged in the same vertical plane the upper one of said arms including an inclined portion having a part thereof cut away, a member having a dial-face fitted over the said cut-away portion of the upper arm, a brake member pivotally mounted in the said cut-away portion of the upper arm extended in the longitudinally-vertical plane of the upper and lower arms and the handle portion of the frame, said brake member being diagonally disposed relative to the said handle end and having its upper end terminating in a finger member and its lower end bent to form a brake-shoe, a ratchet-wheel mounted within said cut-away portion above the brake member, a dial-pointer connected with said ratchet-wheel and adapted to travel on the outside of said dial-face, a shaft journaled in the outer ends of said arms, a measuring-wheel secured to said shaft in a plane at right angles to the plane of the arms, and a circumferentially-adjustable arm axially fulcrumed on the upper bearing-arm and extended to a point beyond the edge of the measuring-wheel, a standard adjustable in the outer end of said arm and a roller-guide mounted in the lower end of the said standard, means for actuating the dial-finger, said means including a cam member mounted upon the measuring-wheel shaft and a pusher-pawl operated by said cam member, said pusher-pawl extended within the said cut-away portion of the upper bearing-arm and engaging the ratchet-disk, substantially as shown and described.

ARTHUR SEBASTIAN NUNAMAKER.

Witnesses:
P. H. NELSON,
W. S. NELSON.